Aug. 27, 1946.    G. W. ASHLOCK, JR    2,406,311
ARTICLE ORIENTATION
Filed Feb. 21, 1945    3 Sheets-Sheet 3

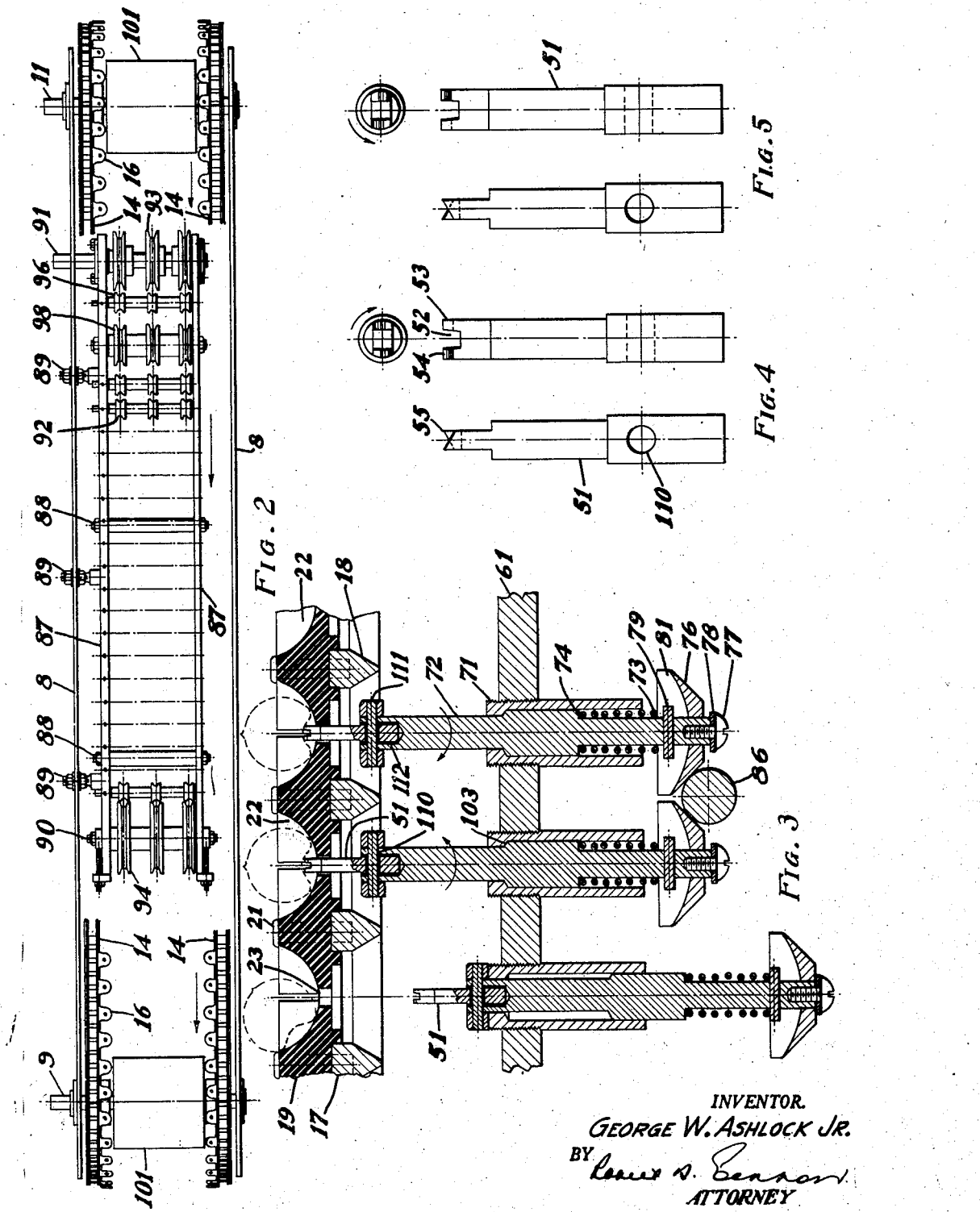

INVENTOR.
GEORGE W. ASHLOCK JR.
BY
ATTORNEY

Patented Aug. 27, 1946

2,406,311

UNITED STATES PATENT OFFICE 2,406,311

ARTICLE ORIENTATION

George W. Ashlock, Jr., Oakland, Calif.

Application February 21, 1945, Serial No. 579,141

12 Claims. (Cl. 198—33)

This invention relates to improvements in devices for receiving an article in any position and for orienting the article into a desired position. A typical example of this is the so-called straightening operation performed upon cherries and like fruits, the cherries being deposited upon the device in haphazard positions of alignment, the device operating upon the cherries to place them in a desired position, usually one wherein the stem indent in the cherry and the longitudinal pit axis are in alignment with a vertical axis. Orientation or straightening of such articles is generally practiced because the articles are subject to a subsequent operation wherein the stone or pit present is removed or the article is otherwise processed. With the article in a predetermined position, the subsequent processing operation can be performed in a predetermined manner. For example, the stone or pit can be forcefully ejected through the stem indent with a minimum of bruising visible on the exterior surface of the fruit.

The earliest successful orientation device of which I am aware is that disclosed in the Goranson Patent 1,742,653 issued January 7, 1930. Subsequently I have introduced other machines for performing the orientation operation and one may refer to my prior Patents Nos. 2,212,892 and 2,213,893 for examples of these. The various means disclosed in these patents operate with a high degree of efficiency on fruit which is substantially spherical. Present fruit grading operations include the use of mechanical devices which size the article by its maximum dimension. Thus, in the case of cherries, truly spherical ones and ovoidal ones will be found in the same grade because each shape was of the same maximum size. Prior machines will not straighten nor orient an ovoidal shaped fruit with any degree of efficiency and one or more inspectors are usually employed upon each machine to either remove the irregularly shaped cherries or else to straighten them by hand prior to the processing step. If this is not done then the product from the processing operation must be inspected and each offgrade article removed, the article being "offgrade" because the pit was removed, for example, through the side and not through the stem indent.

The machine of the present invention is particularly suited to the orienting of those generally arcuate articles which have an indent at one end thereof irrespective of whether the article is spherical or ovoidal.

It is in general the broad object of the present invention to provide an improved orienting device.

A further object of the present invention is to provide an orienting device in which the article is positively rotated until it is oriented, the article thereafter being maintained in its oriented position.

The invention includes other objects and features of advantage, some of which, together with the foregoing, will appear hereinafter wherein the present preferred form of orienting device is disclosed.

In the drawings accompanying and forming a part hereof,

Figure 2 is a plan view, portions of the machine being omitted or broken away to show the relation between the main fruit conveyor and the fruit orientor driving means.

Figure 3 is a transverse view in section showing the relation between the main fruit conveyor means, the orienting device and the drive for the orientors.

Figure 4 and Figure 5 each include a plan view, a side and an end elevation illustrating the construction of the orientors provided, Figure 4 illustrating an orientor to be rotated in a clockwise direction while the orientor shown in Figure 5 is to be rotated in a counterclockwise direction.

Figure 6:
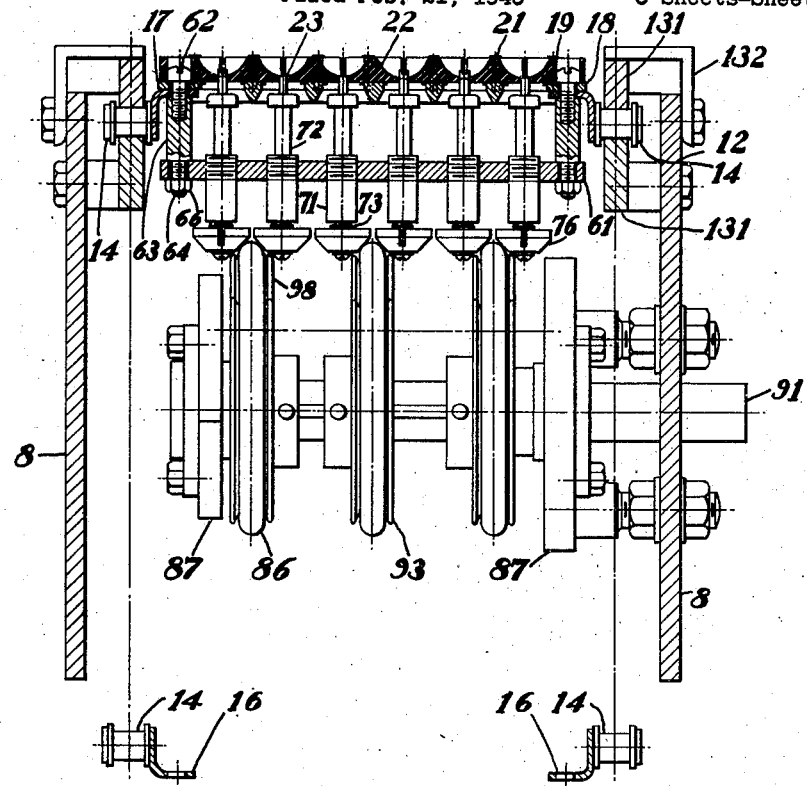

Figure 6 is a transverse section taken across the machine looking toward the front of the machine.

Figure 7:
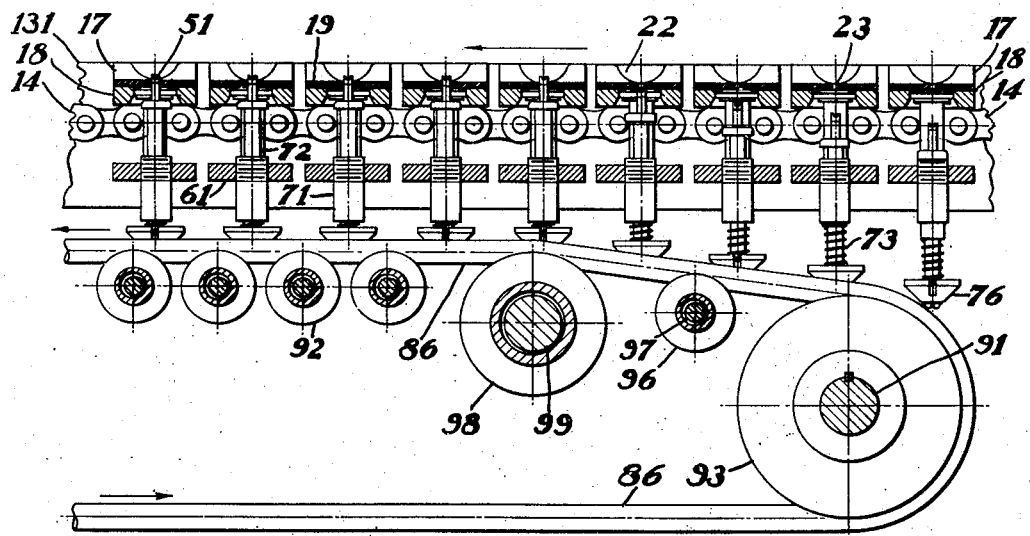

Figure 7 is a side elevation illustrating the relation between the main conveyor, the orientors and the means for positioning and for driving the orientors.

The main frame and main conveyor

The machine of the present invention comprises a suitable frame generally indicated at 6 and including suitably spaced side plates 8 mounted upon the legs 7 and providing a support for a main conveyor 10. At each end of the side plates shafts 9 and 11 are mounted in suitable bearings, each shaft carrying a pair of sprockets 12 supporting a continuous conveyor chain 14.

Each of the chains includes links having ears 16 projecting therefrom to provide support for article carriers indicated generally by numeral 17 and preferably formed as is more particularly shown and described in my prior Patents Nos. 2,209,305 or 2,314,862. Each of the article carriers includes a base plate 18 upon which is mounted a rubber plate 19 retained in place as by being bonded directly to the metal base plate 18 or by utilization of pins 21. Each of the carriers includes a plurality of article receptacles 22, each receptacle having an aperture 23 in the bottom thereof. In the form shown, six receptacles are provided but more or less can be employed. Each receptacle is of a size somewhat larger than the article to be handled.

The drive

The main or article conveyor 10 provided by chain 14 and the several carriers 17 is preferably moved continuously about an arcuate path and in the form of machine disclosed this is accomplished by a motor-speed reducer unit indicated generally at 31 and mounted on superstructure 30. A drive shaft 32 extends therefrom and upon this is mounted a sprocket 33. A chain 34 is passed about this sprocket and about sprocket 35 on a shaft 36 journalled in the superstructure. The superstructure can include a processing device such as the pitting and stoning mechanism disclosed in my Patents 2,157,518 and 2,219,832. Shaft 36 also carries a sprocket 37 connected by chain 38 to a sprocket 39 on idler shaft 40. Another sprocket 141 on the idler shaft 40 is connected by chain 142 to a sprocket 143 on shaft 9 so the processing mechanism and the conveyor 10 are driven in a timed relationship. Sprocket 143 is rotatable on shaft 9 (see Fig. 1 in Patent 2,157,158) so the processing mechanism and the conveyor move continuously and in the proper relationship.

The feed hopper

At the rear end of the machine, a continuous supply of articles to be oriented and subsequently processed are delivered to the main conveyor by conveyor 41 movable through hopper 45 over support plate 42 in a timed relation to the movement of conveyor 10, conveyor 41 being driven by sprocket 43 on shaft 11 connected by chain 44 to sprocket 46 on shaft 47 which supports the forward end of conveyor 41. The relation between conveyor 41 and conveyor 14, the driving of these and the manner of depositing articles from conveyor 41 onto conveyor 14 is fully shown and set forth in my Patent No. 2,288,062. The supply of articles to the main conveyor can be provided in any desired manner and that shown is one used successfully.

The orientation operation

Each article delivered by conveyor 41 onto conveyor 10 is arranged in a haphazard and random manner in its supporting receptacle 22. If these are to be processed to produce the highest grade of article, it is necessary that each article be turned until its stem indent is in a predetermined position, preferably with the stem indent overlying aperture 23 so that subsequently, for example, the pit or stone can be ejected through the stem indent and through the aperture 23 in the receptacle 22 by the mechanism of my Patents 2,157,518 and 2,219,832.

In accordance with this invention, means are provided for orienting the fruit in the receptacles 22. This means comprises a rod-like orientor member generally indicated at 51 and adapted to engage positively the fruit in receptacle 22. Depending upon the direction of rotation of the member 51, that end of the orientor which engages the fruit is formed so as to engage the surface of the fruit positively. Referring to Figure 4, for example, I have shown an orienting member 51 which is adapted to be rotated in a clockwise direction, the member being slotted as at 52 to provide upstanding prong-like projections 53 and 54, the leading edges 55 of which advance upon rotation and pinch the surface of the fruit to engage and rotate the fruit positively. In Figure 5 is shown an orienting member 51 which is to be rotated in a counterclockwise direction, the several elements thereof being reversed with respect to those shown in Figure 4.

Considerable attention must be given to the formation of the orienting end of the orienting member or else positive rotation of the fruit to be oriented is not obtained. Merely engaging fruit with a rotatable element does not suffice and the form of the orienting element employed must be such as to ensure positive engagement of the fruit surface. If one observes the action of the orienting member it will be found that the fruit is positively rotated and that the time required for orientation is, in effect, the time required for positively engaging surfaces on the orienting member to traverse the fruit surface a distance equal to the spacing, in the direction of movement of the fruit, between the stem indent end and the point of engagement of the orienting member. The action is comparable to that in stepping off a given lineal distance with a pair of dividers except that the dividers are rotated about their common axis and the surface is caused to move by their rotation.

The orienting members are each supported above the bottom of the receptacle 22 a distance corresponding to the depth of the stem indent, so that when the fruit is oriented, each orienting member rotates in the stem indent and does not disturb the oriented fruit. Thus, the orientation is a matter of contact between the orienting member and the surface of the unoriented fruit, the orienting member moving the fruit positively into oriented position when the orienting contact is released and the orienting member is no longer effective to disturb the orientation but instead, serves to maintain the article or fruit in this position.

One must also regulate the rate of rotation of the orientation members because I have found that the speed of rotation is related to the weight of the fruit. By observing the operation of the machine, one can correlate the rate of orientation with the speed of rotation of the orienting members, changing the rate to secure the orientation in the least possible period of time and so ensuring that the greatest number of articles will be oriented during the permissible period of orientation.

Rotation of the orientors

If the subsequent processing operation does not require use of apertures 23, the orientors can be constructed in a permanent relation to each aperture. Since the present machine is intended to permit fruit stoning, means are provided for raising the orientors into position and for rotating them.

To provide a support for the orienting members a plate 61 is mounted upon each of the fruit carriers 17. As is illustrated in Figure 6, each carrier is secured at each end to chain 14 by a screw 62. Each screw extends into a rod 63 which positions the carrier and acts as a spacer and support for plate 61, the threaded end 64 of the rod being passed through the plate 61, nuts 66 being placed thereon to secure the plate in position.

Thus, each plate 61 extends across the machine beneath each of the carriers in a fixed spaced relation. A threaded barrel 71 is screwed into each plate below and in alignment with each aperture 23 to provide a support for a shaft 72 which is passed through the barrel. A spring 73 is positioned between shoulder 74 on the shaft 72 and a drive pulley or wheel 76 positioned on the end of shaft 72 and secured in place by screw 77 and washer 78. A pin 79 is inserted in the shaft, the pin fitting in a slot 81 formed in the pulley 76 and providing a sliding connection between shaft 72 and the pulley.

As appears in Figures 3, 6 and 7, a plurality of belts 86 are provided, each belt being engaged on opposite sides thereof by a pulley 76 on an end of one of the shafts 72 whereby the shafts 72 are rotated in opposite directions. Inasmuch as the main conveyor disclosed includes six receptacles, three belts are provided as is indicated in Figure 6, each belt driving a pair of orientor shafts. To drive the belts and at the same time provide support therefor, a pair of plates 87 are secured together in a spaced relationship by spacer bolts 88, the plates being mounted upon only one of the side plates 8 by suitable studs 89 to permit the belts to be removed and replaced readily. At opposite ends of the plates 87 are provided shafts 90 and 91, the latter extending through a plate 8 for driving by a separate prime mover (not shown) which includes speed regulation means. Along the upper run of the plates are provided a plurality of small pulleys 92, there being three sets of these disposed in a row along the machine, each of the small pulleys being so closely adjacent to the other that in effect each belt 86 moves over a straight line path parallel to that of the main conveyor 10. Pulleys 93 on shaft 91 are of a smaller diameter than are pulleys 94 on shaft 90 at the forward end of the machine to permit belt 86 to lift the several orienting shafts 72 and the orienting members 51 from the disengaged position (righthand side of Fig. 1 and Fig. 7) into engagement with fruit in the several receptacles 22.

To maintain the desired lift an additional roller 96 is provided on shaft 97 to provide the first lift or elevation in the belt after it passes over pulley 93 while the final lift and direction onto the planar portion of the belt path is provided by a pulley 98 on shaft 99. Between pulleys 98 and 94, the belt run is parallel to that of the main conveyor.

Figure 1:
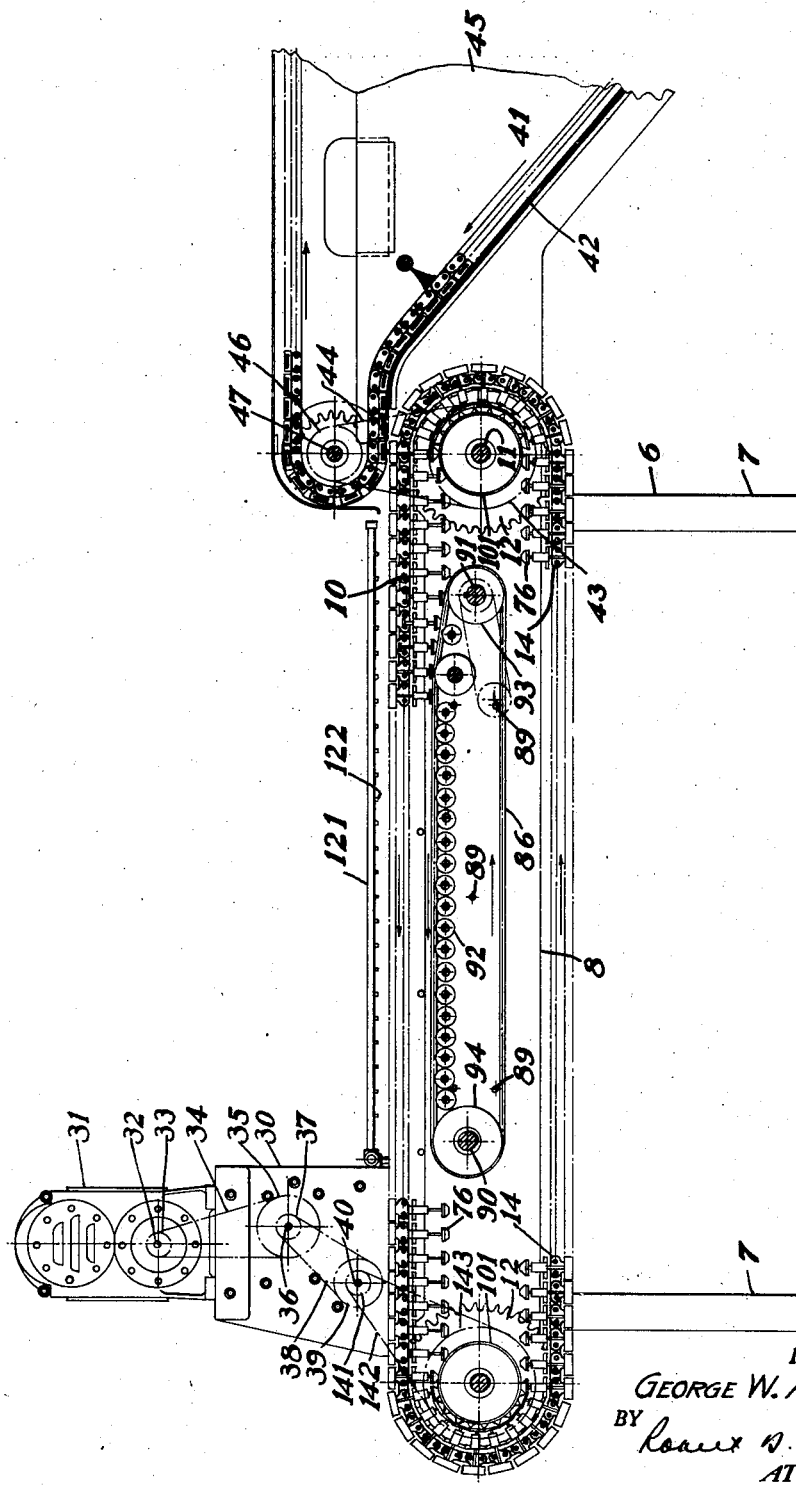
Figure 1 is a side elevation with portions of the machine broken away and shown in section to indicate the general assembly.

As appears in the righthand portion of Fig. 1 and Fig. 7, the normal position of the orienting members is in the retracted position wherein the members lie outside of the apertures 23. However, as the main conveyor moves along, each wheel 76 is brought into contact with one of the belts 86, on one side or the other thereof, the orienting member 51 being thus gradually projected upwardly through its associated aperture 23 into the receptacle until finally the orienting member projects through aperture 23 into the receptacle the required distance.

When each of the wheels 76 has been raised by belt 86 so that the orienting member associated therewith is in its projected position and extends through aperture 23 to engage fruit for orientation in the receptacle 22, springs 73 will be compressed and each shaft member 72 will be moved upwardly in its associated support 71 until shoulder 103 thereon engages a cooperating shoulder in the end of support 71. The tension of the spring will then be exerted downwardly on the belt whereupon a positive driving engagement between the wheels 76 and the belt is secured.

The upward thrust of springs 73 upon plate 61 is transmitted to conveyor chains 14. To prevent these from being lifted, guide plates 131 are secured in place on side plates 12 by angle iron members 132, the chains 14 thus passing between upper and lower guides between shaft 92 and shaft 91.

Due to the fact that belts 86 move at a relatively faster rate than does the conveyor, wheels 76 are turned and each of the orienting members is thus rotated in its receptacle to engage fruit positively and effect its rotation therein as has been previously described.

When the main conveyor reaches that point in its travel just beyond the position of shaft 90, the orienting members are permitted to drop down out of the receptacles and the apertures 23 are thus freed for subsequent fruit processing, if this be desired. For example, removal of the orienting members from apertures 23 enables cherries to be pitted, the pits being suitably ejected through the apertures 23 by the pitting mechanisms disclosed in my Patents No. 2,157,518 and No. 2,219,832, and which mechanism is located in the superstructure 30 in Figure 1.

Between sprockets 12 at each end of the machine, drums 101 are provided to lift each of the orienting members and their associated parts and permit the conveyor to return about the sprockets without jamming of the wheels 76 as the conveyor returns.

Wobble rotation

Referring particularly to Figures 3, 4 and 5, it will be noted that each of the orienting members 51 is mounted loosely upon a pin 111 extended transversely through the hole 110 in end 112 of shaft 72; the aperture 110 is larger than the pin 111 which supports the member 51. It will also be observed upon reference to Figure 3 that I have shown each orienting member 51 as spaced from the sides of apertures 23. This is done intentionally, the sides of apertures 23 providing a loose support for the orienting member 51 so that these wobble as they rotate. This I have found enables the orientors to be much more effective. When the fruit is oriented, the engagement of the end of the member with the stem indent prevents the member from a wobble rotation.

Receptacle flooding

As appears in Figure 1, I preferably position a pipe 121 over each row of articles on the main conveyor undergoing orientation, ejecting through nozzles 122 on this pipe a suitable lubricant, as is disclosed in my prior Patent No. 2,308,038, to facilitate orientation and to lubricate the orienting members 51 in apertures 23.

Carriers

While I have disclosed my invention in connection with carriers 17 having semi-spherical receptacles 22 therein, of the form disclosed in my Patents 2,209,305 and 2,314,862, one can also utilize receptacles of other configurations. For example, I have successfully utilized a receptacle having straight sides and an open bottom as is shown in Figure 5 of my Patent 2,296,490 and in Figures 4, 5, and 6 of my Patent 2,190,970. What is essential is that the fruit engaging means on the end of pins 51 be such as to engage the fruit surface positively. Fruit engaging means which merely slide over or slip on the surface of the fruit are not successful; to ensure positive rotation until orientation is achieved, positive fruit surface engagement must exist between the end of the pin and the fruit surface.

The rotatable pins can be mounted on a separate conveyor (as conveyor 60 in my Patent 2,296,490) moved in a timed relation with the article conveyor 10 to position each pin for rotation in an article receptacle. In case of a conveyor advanced only intermittently and not continuously, the pins can be projected and rotated by suitable mechanism such as that disclosed in the aforementioned Goranson patent. The pins need not operate from below the article except when it is desired to have the dimple or stem indent at the bottom. If it is desired to locate the articles with the dimple or indent reversed 180° from the position shown in Figure 3, the pin conveyor can run along parallel to and over a portion of the run of conveyor 10 to rotate the articles to orient the articles with the dimple at the top.

*Stem indent*

The terms "stem indent" and "dimple" are used broadly herein and as including surface configurations suitable for orienting engagement by pins 51 irrespective of whether or not this configuration is provided by nature or by an operation performed on the article. This will serve to illustrate the breadth in applicability of the present invention. For example, some types of olives have such a small stem indentation that a pin 51 can engage and locate. If such an olive be pitted, as is shown in my Patent 2,271,675 (Figures 2-4), a sufficient indentation is formed to enable the olive to be oriented successively in another operation after it has been pitted. Thus pitted olives can be later oriented accurately, after having been pitted and then assembled in a random mass, for stuffing with pimiento, nuts, onions, or the like.

I claim:

1. A device for orienting an article having a generally spherical contour and a stem indent, said device comprising a receptacle for supporting said article, said receptacle having an opening therein, a rod member of substantially smaller diameter than said opening and extending through said opening to engage an article therein, means supporting said member for a wobble rotation in said opening, means on said rod member adapted to engage said article positively, and means for rotating said rod member in said opening.

2. A device for orienting an article having a generally spherical contour and a stem indent, said device comprising a receptacle for supporting said article, said receptacle having an opening therein, a rod member of smaller diameter than said opening and extending through said opening into said receptacle only a distance sufficient to permit said member to rotate freely when said member is in said stem indent, means supporting said member for a wobble rotation in said opening, means on said rod member to engage said article positively, and means for rotating said rod member in said opening.

3. In an indented fruit handling machine, the combination of a holder for the fruit having an opening in its under side, means for placing the fruit in the holder in any position, and means for engaging the fruit positively in a driving engagement to turn the fruit into a position with the indent downward, said fruit turning means comprising a vertically positioned rod having a plurality of projections on its upper terminal end, each projection having a relatively sharp, knife-like end formed by a substantially flat vertical face and a rearwardly extending trailing face.

4. In an indented fruit handling machine, the combination of a holder for the fruit having an opening in its under side, means for placing the fruit in the holder in any position, and means extending through said opening and rotatable therein to engage the fruit positively in a driving engagement to turn the fruit into a position with the indent downward, said fruit turning means comprising a vertically positioned rod having a plurality of projections on its upper terminal end, each projection having a relatively sharp, knife-like end formed by a substantially flat vertical face and a trailing face extending away from said vertical face and in a direction opposite to the direction of rotation of said rod.

5. In an indented fruit handling machine, a fruit conveyor movable over a path and having a plurality of article receptacles arranged serially, each receptacle having an opening in the bottom thereof, a series of pins carried by said conveyor, each pin being adapted to be projected through an opening in a receptacle bottom and having a plurality of knife-like edges on its projected end formed to engage positively in a driving engagement the surface of an article in said receptacle, means for moving each pin to project through an opening, and means for rotating a pin while projected.

6. In an indented fruit handling machine, a fruit conveyor movable over a path and having a plurality of article receptacles arranged serially, each receptacle having an opening in the bottom thereof, a series of pins carried by said conveyor, each pin being arranged in an immediate and cooperative association with one of said receptacles and being adapted to be projected through an opening in a receptacle bottom, the projected end of each pin having a plurality of relatively sharp, knife-like fruit engaging projections thereon to engage fruit positively, means for moving each pin to project through an opening, and means for rotating a pin while projected.

7. In an indented fruit handling machine, a frame having opposite parallel side members, a fruit conveyor movable over a path and having a plurality of article receptacles arranged serially, each receptacle having an opening in the bottom thereof, a series of pins carried by said conveyor, each pin being arranged in an immediate and cooperative association with one of said receptacles and being adapted to be projected through an opening in a receptacle bottom and having its projected end formed to engage positively in a driving engagement the surface of an article in said receptacle, a second frame mounted on only one of said side members and spaced from the other of said side members, a plurality of rollers on said second frame, and an endless belt adapted to be positioned over said second frame on said rollers to project each pin into an aperture and rotate said pin in said aperture, and means for rotating a pin while projected.

8. A fruit orienting device consisting of a pin having a longitudinal axis and adapted to be rotated about said axis in a selected direction, said pin having one end adapted to engage a fruit surface positively, said end including a slot extending across said pin and defining two opposite terminal projections, said projections each having a leading edge and a trailing face sloping downwardly from said leading edge and in a direction opposite to said selected direction.

9. A fruit orienting device consisting of a pin having a longitudinal axis and adapted to be rotated about said axis in a selected direction, said pin having one end adapted to engage a fruit surface positively, said end including a slot extending across said pin and defining two opposite terminal projections, said projections each having a relatively sharp, knife-like, leading edge and a trailing face sloping downwardly from said leading edge and in a direction opposite to said selected direction.

10. In an indented fruit handling machine, the combination of a holder for the fruit having an opening in its under side, means for placing the fruit in the holder in any position, and a pin for engaging the fruit positively in a driving engagement to turn the fruit into a position with the indent downward, said pin having a longitudinal axis and adapted to be rotated about said axis in a selected direction, said pin having one end adapted to engage a fruit surface positively, said end including a slot extending across said pin and defining two opposite terminal projections, said projections each having a leading edge and a trailing face sloping downwardly from said leading edge and in a direction opposite to said selected direction.

11. In an indented fruit handling machine, the combination of a holder for the fruit having an opening in its under side, means for placing the fruit in the holder in any position, and a pin extending through said aperture and rotatable therein to engage the fruit positively in a driving engagement to turn the fruit into a position with the indent downward, said pin having a longitudinal axis and adapted to be rotated about said axis in a selected direction, said pin having one end adapted to engage a fruit surface positively, said end including at least two projections thereon, each projection having a leading face and a trailing face sloping down and away from said leading face to provide a tooth-like projection for positive engagement with a fruit surface.

12. In an indented fruit handling machine, the combination of a holder for the fruit having an opening in its under side, means for placing the fruit in the holder in any position and a pin extending through said opening and rotatable therein to engage the fruit positively in a driving engagement to turn the fruit into a position with the indent downward, means supporting said fruit engaging means for rotation with respect to said holder over a circular path of a greater diameter than the diameter of said opening, said pin having a longitudinal axis and adapted to be rotated about said axis in a selected direction, said pin having one end adapted to engage a fruit surface positively, said end including at least two projections thereon, each projection having a leading face substantially parallel to said axis and a trailing face sloping down and away from said leading face in a direction opposite to said selected direction.

GEORGE W. ASHLOCK, JR.